United States Patent [19]

Seidel

[11] Patent Number: 4,578,121
[45] Date of Patent: Mar. 25, 1986

[54] METHOD FOR THE CLEANING OF CABLE ENDS

[75] Inventor: Udo Seidel, Hamburg, Fed. Rep. of Germany

[73] Assignee: Minnesota Mining and Manufacturing Company, St. Paul, Minn.

[21] Appl. No.: 647,737

[22] Filed: Sep. 6, 1984

[30] Foreign Application Priority Data

Sep. 19, 1983 [DE] Fed. Rep. of Germany ....... 3333760

[51] Int. Cl.⁴ .............................................. B08B 3/10
[52] U.S. Cl. ..................................... 134/25.4; 134/34
[58] Field of Search ........................... 134/25.4, 34, 6; 15/104.3, 104.4

[56] References Cited

U.S. PATENT DOCUMENTS 2,668,129 2/1954 Battle ....................................... 134/6

Primary Examiner—Richard V. Fisher
Assistant Examiner—Sharon T. Cohen
Attorney, Agent, or Firm—Donald M. Sell; James A. Smith; Terryl K. Qualey

[57] ABSTRACT

A method for cleaning an exposed bundle of cable ends of multi conductor transmission cable, especially grease filled telephone cables, in which one places the bundle of cable ends, preferably after separation and/or rough cleaning, into a cleaning fluid-containing manually kneadable, flexible pouch, the open end of the pouch is sealed around the cable and a forceful cleaning action is obtained by kneading the pouch around the cable ends. After sufficient interaction time, the bundle is removed from the cleaning pouch and the cable ends are preferably wiped with a cloth.

4 Claims, 9 Drawing Figures

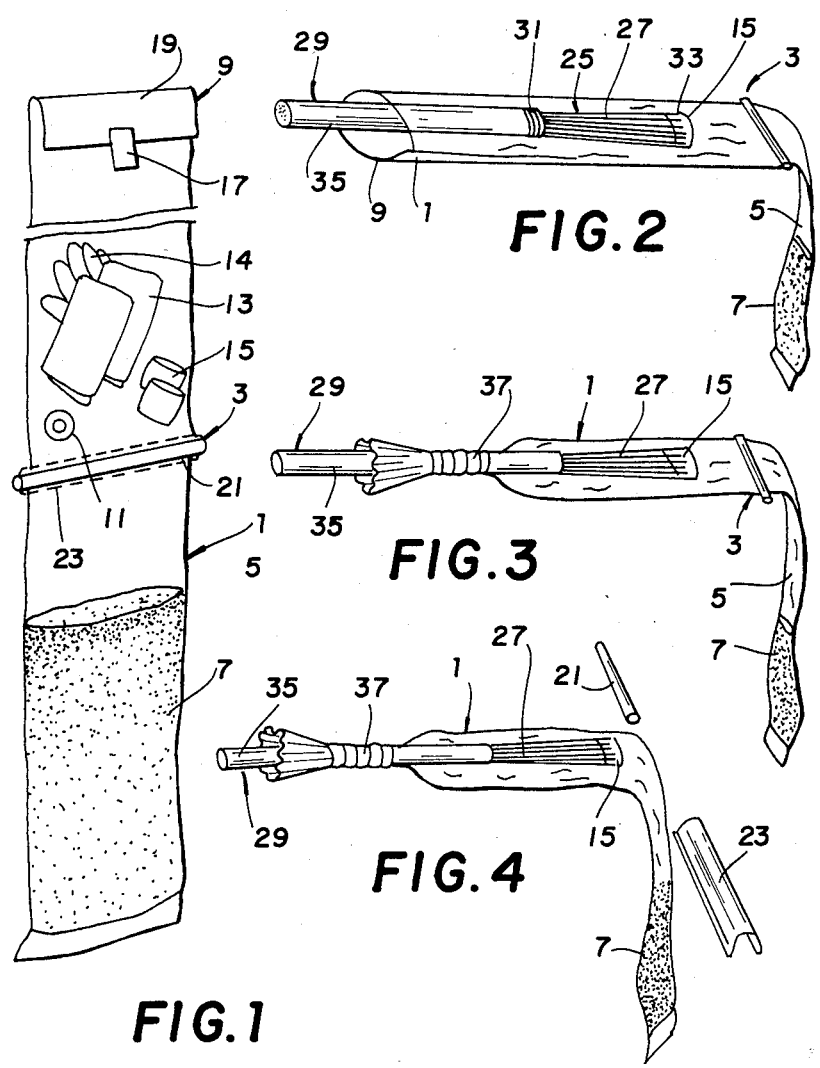

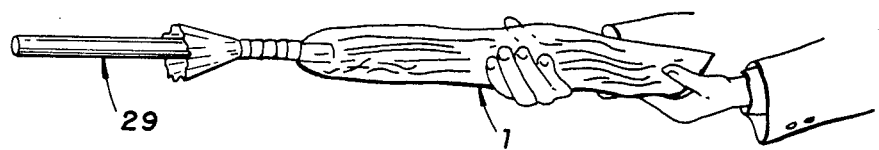
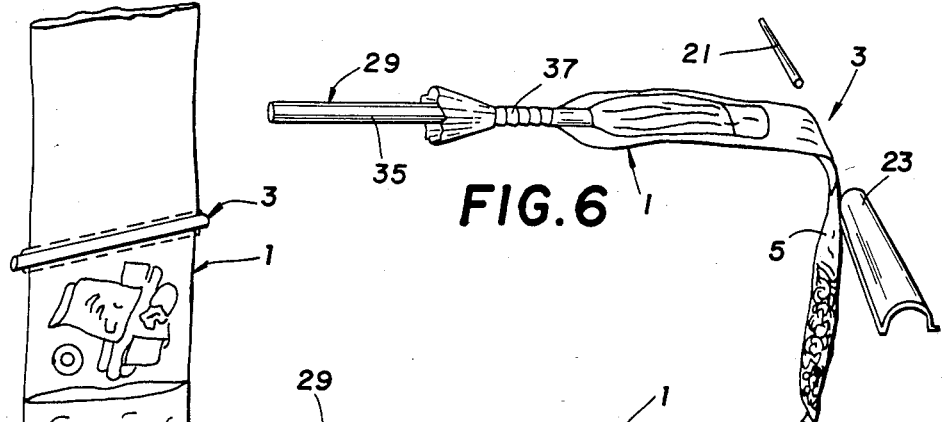
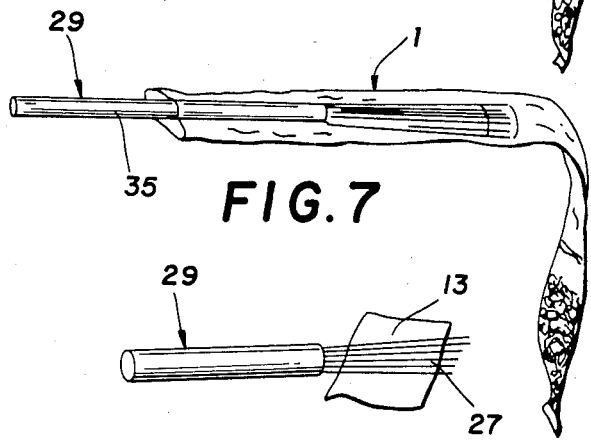

METHOD FOR THE CLEANING OF CABLE ENDS

DESCRIPTION

1. Technical Field

The invention concerns a method and device for the cleaning of an exposed bundle of cable ends of a multi conductor transmission cable, especially a grease filled telephone cable, in which one places the exposed cable ends, preferably after separation and/or rough cleaning, into a cleaning fluid-containing cleaning container, moves the cleaning liquid relative to the cable ends in a strong movement and after sufficient interacting time removes the bundle from the cleaning container and preferably finishes the cleaning with a cloth.

2. Background Art

A method and a device for cleaning grease filled cable ends are known from DE-OS No. 24 09 989 in which the cleaning container, which is preferably made as a one-side open tube, is connected to an ultrasound oscillator and to a rotating pump for a leading loop for the cleaning fluid. The use of an ultrasound oscillator requires room and an essentially rigid construction of the cleaning container. Also the expenditure for the liquid loop is considerable. Electrical current for the ultrasound oscillator and the rotating pump must be available. The supply and drains for the cleaning fluid and the units for the acoustical connection of the ultrasound oscillator make the cleaning container cumbersome.

This known method and equipment is in practice usually not usable because of limited space or the lack of electricity, as in a manhole, and instead cable cleaning is usually done by hand. Cleaning by hand, however, is very unpleasant and time-consuming because of the cohesive greasy consistency and the relatively large quantity of the sealing grease to be removed and the results obtained greatly depend on the precision and skill of the workman. Large quantities of the grease may remain between the conductor ends and this may in the following assembly steps, for example, the pouring of a pressure type closure with cable resin, lead to serious failures, for example, porosities, which under certain conditions become noticeable only a certain operating time after the work is completed and then require great expense for their elimination. This applies especially with multi conductor and/or thin conductor cables, such as telephone cables.

DISCLOSURE OF INVENTION

The present invention provides a method and a device for the cleaning of cable ends, which can be used in a confined space and which, in a short time, can obtain a satisfactory cleaning of grease filled cable ends. The bundle of cable ends is inserted into a manually kneadable, flexible pouch containing a cleaning fluid, the open end of the pouch is sealed around the cable and a forceful cleaning action is obtained by kneading the pouch around the cable ends within the pouch.

Because the forceful movement of the cleaning fluid is obtained by kneading of the pouch by hand, neither an ultrasound oscillator nor a rotating pump are required and no electrical current connection is required; all this reduces the cost and the space needed appreciably. Because the pouch during the kneading is pressed to the bundle, a smaller quantity of cleaning fluid is required than when a rigid cleaning container is used.

The invention has the special advantage that it also can be used with glass fibre cables.

The flexible pouch is a simple and inexpensive part which after use can be thrown away. This provides the additional advantage that the refuse which is present after the cleaning procedure, including the cleaning fluid, can be enclosed in the pouch and everything conveniently discarded.

BRIEF DESCRIPTION OF DRAWINGS

In the drawings:

FIG. 1 is ia schematic view of a device constructed in accordance with the present invention;

FIGS. 2 through 8 illustrate in schematic perspective views, sequential steps of the method of the invention; and FIG. 9 shows the pouch filled with waste material and closed after completion of the procedure.

BEST MODE FOR CARRYING OUT THE INVENTION

FIG. 1 illustrates a cable cleaning device constructed in accordance with the present invention. It includes a cleaning container in the form of a manually kneadable, flexible elongate pouch 1. Sealed compartment 5 is formed at the closed end of the pouch, by means of an external removable closure 3, in which compartment 5 a cleaning fluid 7 is retained. The length of the pouch between removable closure 3 and the open end 9 of the pouch is made such that therein a cable end which is to be cleaned can be inserted. In the illustrated embodioment the pouch is part of a cleaning kit and the other parts of the kit are supplied in a second compartment of the pouch between the closure 3 and the open end of the pouch. The kit may include, for example, an adhesive tape roll 11, paper cleaning towels 13, disposable glove 14 and flexible pockets 15 to apply to the free cable ends. In order to prevent the loose parts of the kit from dropping out of the end of the pouch, the open end 9 of the pouch is closed with a piece of adhesive tape 17 which holds a folded end 19 of the pouch to the rest of the pouch.

Pouch 1 can be kneaded manually and consists out of a transparent film. The illustrated removable liquid tight closure 3 consists of a bar 21 which is clamped to pouch 1 by a U-shaped clamping hoop 23. This closure can also be applied to other locations on the pouch.

FIG. 2 illustrates the first step of the method. The loose parts of the kit are removed from the pouch 1 and a bundle 25 of cable ends 27 of a grease filled multi conductor water-proof telephone cable 29 is wiped with a cleaning towel 13. If the cables are a complete bundle or divided in groups and/or held together by wire, the cables are spread by hand so that during the cleaning the cleaning fluid can easily enter between the conductors. At the free ends 33 of the cable 27 a flexible pocket 15, which is removed from pouch 1, is applied. This pocket 15 consists of a transparent plastic film. The bundle of cable ends is inserted into the pouch 1 until the open end of the pouch is on the cable sheath 35.

The open end of pouch 1 is then sealed around the cable sheath 35 with adhesive tape 37 from adhesive tape roll 11. FIG. 3 illustrates the pouch and cable at this stage of the process. Note that the sealed end of the pouch is on the cable sheath with the closed end of the pouch containing the cleaning fluid hanging in a vertical position.

Next, closure 3 is opened by the removal of the U-clamp loop 23 and removal of the thereby released bar 21. FIG. 4 shows the condition then present.

FIG. 5 shows then, how pouch 1 can be kneaded by hand and thereby the cleaning fluid is moved forcefully around and between the cable ends. The kneading action is continued until substantially all of the grease is dissolved in the cleaning fluid.

As shown in FIG. 6, the cleaning fluid with the dissolved grease is then manually pushed back again in compartment 5 at the closed end of the pouch. Note that, after the manual kneading process, the closed end of the pouch is allowed to hang back into the vertical position to allow the cleaning fluid to drain off of the cable ends. The adhesive tape 37 around the open end of pouch and the cable sheath 35 is removed (see FIG. 7). Pouch 1 is then removed from the cable end and the cable ends 27 are wiped with a towel 13 (see FIG. 8).

The used loose parts of the kit may be inserted into the pouch with the cleaning fluid and the closure 3 applied to seal the pouch (see FIG. 9).

Pouch 1 consists of a flexible transparent plastic material which is not affected by the cleaning fluid 7. The cleaning fluid may, for example, be trichlorethane or methylenechloride and the pouch 1 may be made of polyethylene.

I claim:

1. A method for cleaning a bundle of cable ends of a multi-conductor transmission cable positioned with its longitudinal axis horizontal, comprising:

providing a manually kneadable, flexible, elongate pouch containing a cleaning fluid, inserting the bundle of cable ends into the pouch until the open end of the pouch is on the cable sheath with the closed end of the pouch containing the cleaning fluid hanging vertically, sealing the open end of the pouch around the cable sheath, moving the closed end of the pouch to a horizontal position to cause the cleaning fluid to be distributed throughout the bundle of cable ends, manually kneading the pouch to forcefully move the cleaning fluid around and between the cable ends and, moving the closed end of the pouch back to the vertically hanging position to allow the cleaning fluid to drain off the cable ends.

2. The method of claim 1 including the step of placing a flexible pocket (15) on the free end of the cable ends before the bundle of cable ends is inserted into the pouch.

3. The method of claim 1 including the step of enclosing any waste materials, including the cleaning fluid, in the pouch after the cleaning procedure is completed.

4. The method of claim 1 wherein the cleaning fluid is initially sealed in a compartment at the closed end of the pouch by a removable closure and including the step of removing the closure after said step of sealing the open end of the pouch around the cable.

* * * * *